United States Patent [19]

McMurtry et al.

[11] Patent Number: 5,334,918
[45] Date of Patent: Aug. 2, 1994

[54] METHOD OF CONTROLLING A COORDINATE POSITIONING MACHINE FOR MEASUREMENT OF A WORKPIECE

[75] Inventors: David R. McMurtry, Wotton-Under-Edge; Alexander T. Sutherland, Edinburgh, both of United Kingdom

[73] Assignee: Renishaw plc, Gloucestershire, United Kingdom

[21] Appl. No.: 820,693

[22] PCT Filed: Jun. 20, 1991

[86] PCT No.: PCT/GB91/01001

§ 371 Date: Jan. 27, 1992

§ 102(e) Date: Jan. 27, 1992

[87] PCT Pub. No.: WO91/20020

PCT Pub. Date: Dec. 26, 1991

[30] Foreign Application Priority Data

Jun. 20, 1990 [GB] United Kingdom ............... 9013744

[51] Int. Cl.⁵ ............................................ A25J 9/16
[52] U.S. Cl. ............................ 318/568.16; 318/570; 364/474.03; 364/560
[58] Field of Search ............ 318/640, 570, 568.16; 33/503, 504; 364/474.03, 560

[56] References Cited

U.S. PATENT DOCUMENTS

| | | | |
|---|---|---|---|
| 3,384,407 | 5/1983 | Miyamoto | 33/174 P |
| 4,648,024 | 3/1987 | Kato et al. | 318/573 X |
| 4,796,763 | 9/1988 | Trieb et al. | 364/559 |
| 4,866,643 | 9/1989 | Dutler | 33/504 X |
| 4,965,499 | 10/1990 | Taft et al. | 318/568.11 |
| 5,047,966 | 9/1991 | Crow et al. | 33/504 X |
| 5,088,055 | 2/1992 | Oyama | 364/474.18 X |
| 5,140,236 | 8/1992 | Kawamura et al. | 318/568.1 |

FOREIGN PATENT DOCUMENTS

| | | |
|---|---|---|
| 0077243A1 | 4/1983 | European Pat. Off. . |
| 0139011A1 | 5/1985 | European Pat. Off. . |
| 0199962A | 12/1986 | European Pat. Off. . |
| 0211202 | 2/1987 | European Pat. Off. . |
| 0353302A1 | 2/1990 | European Pat. Off. . |

Primary Examiner—William M. Shoop, Jr.
Assistant Examiner—Brian Sircus
Attorney, Agent, or Firm—Oliff & Berridge

[57] ABSTRACT

A coordinate positioning machine is equipped with either an optical probe or a contact measuring probe. Movement of the head of the machine to enable the probe to scan an unknown surface is controlled by predicting the position of a subsequent point to which the head of the machine is to be driven upon the basis of three most recently measured points, $P_1$, $P_2$, $P_3$. The prediction of the subsequent point $P_4$ is performed by machine control in real time.

10 Claims, 2 Drawing Sheets

METHOD OF CONTROLLING A COORDINATE POSITIONING MACHINE FOR MEASUREMENT OF A WORKPIECE

BACKGROUND OF THE INVENTION

1. Field of the Invention

The present invention relates to a method for controlling a coordinate positioning machine to scan a workpiece.

Such a machine, (e.g. a machine tool or coordinate measuring machine) typically comprises a head, movable in three directions (X,Y,Z) relative to a bed, and a scale, together with a scale-reader for measuring the displacement of the head relative to a datum in each of the X,Y and Z directions. The head of the machine carries a measuring probe for measuring the distance between the head and a surface; the measuring probe may be an optical probe or a touch probe. An optical probe directs a beam of light at the surface, and determines from the reflected beam the position of the surface relative to the head. A contact or touch measuring probe (also known as an analogue touch probe) resiliently supports a stylus on the head in such a manner that the stylus is movable relative to the head in the X,Y,Z directions. Transducers in the probe measure the displacement of the stylus relative to the head in each of the X,Y and Z directions.

It is possible using such a machine, to scan the profile of a workpiece. This is done by moving the head of the machine to bring the probe adjacent the surface to within a range of distance over which the probe may measure the position of the surface (known as the measuring range), and then driving the head of the machine over the surface along a path whose profile is to be measured. When driving the probe over the surface, the probe must be kept within the measuring range (a) in order to collect data, and (b) to prevent collision damage to the machine. Automatically controlling the motion of the head of the machine relative to a surface within the constraints set out above can be difficult when the workpiece contour is not known in advance.

2. Description of Related Art

One prior art method (known from U.S. Pat. No. 4,769,763) of achieving this with a touch probe is to drive the head of the machine in a direction determined from the instantaneous direction of deflection of the stylus from its rest position. Friction between the stylus and the surface makes this technique inaccurate since deflection of the stylus is not perpendicular to the instantaneous path direction.

A prior art method of controlling a machine with an optical probe is shown in FIG. 1. An optical probe 10 directs a beam of light 12 at a surface 14. The beam 12 is reflected by the surface 14, and a position sensitive detector in the probe detects the reflected beam and thus the position of the surface. Such a probe is known from EP 0235235. Movement of the machine is controlled by determining a straight line 16 passing through two previously measured points $Q_1, Q_2$, and predicting the position of the next demanded point $Q_3$ as lying on this line.

SUMMARY OF THE INVENTION

A first aspect of the present invention provides a method for controlling a machine to scan a workpiece with a contact or touch measurement probe in which the head is driven on a path determined upon the basis of previously measured points on said surface, rather than a path determined from the instantaneous direction of stylus deflection.

A second aspect of the present invention provides a method of controlling a coordinate positioning machine, the machine having a head, and a measuring probe connected to the head for sensing a distance between a surface and the head, the method controlling the machine to drive the head along a path adjacent a workpiece surface, and maintain the probe within measuring range of the surface, the method comprising the steps of:

measuring the position of three points on the surface of the workpiece and lying on the path traced by the head;

determining from at least the three previously measured points, the position of a subsequent point; and driving the head to a position at which the measuring probe lies within measuring range of the subsequent point.

This method may be implemented with any measuring probe, for example an optical analogue probe, or an analogue touch (contact measuring) probe. By using three previously measured points, the predictive procedure can take curvature of the surface into account.

In a preferred embodiment of the present invention, the speed with which the head is driven to a position adjacent the further point is determined as a function of the angle between the last three measured points on the workpiece surface.

BRIEF DESCRIPTION OF DRAWINGS

Embodiments of the present invention will now be described, by way of example, and with reference to the accompanying drawings in which.

DESCRIPTION OF PREFERRED EMBODIMENTS

Figure 1:
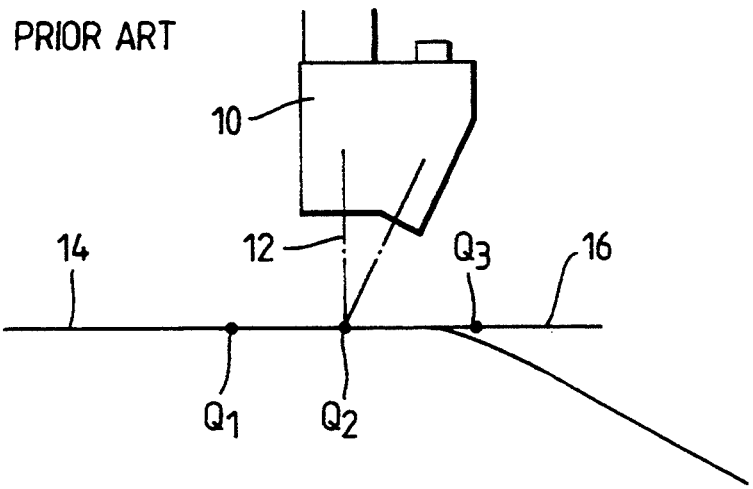
FIG. 1 shows a prior art method of controlling an optical probe.
Figure 2:
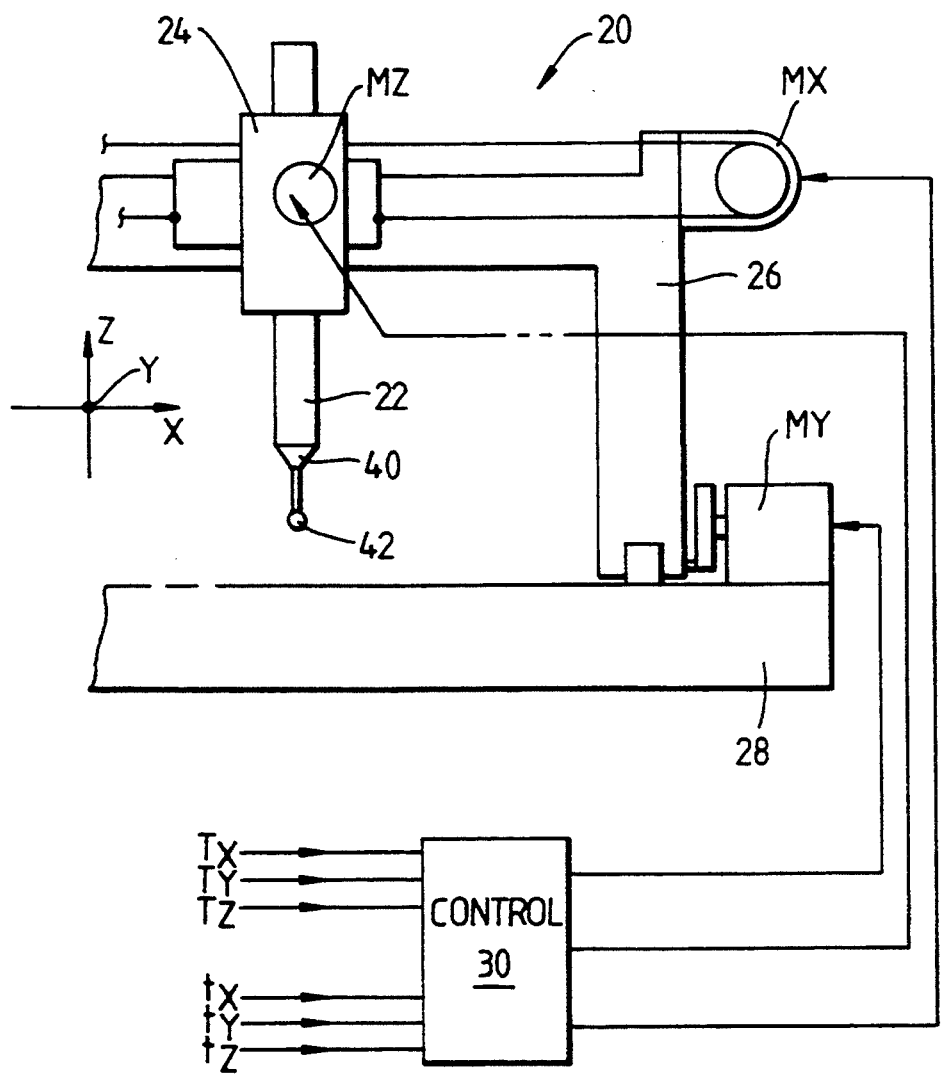
FIG. 2 shows a coordinate measuring machine equipped with a measuring probe.

Referring now to FIG. 2, a coordinate measuring machine 20 has a head 22 movable relative to a carriage 24 in one direction, labelled in FIG. 2 as the Z direction. The carriage 24 is supported on, and movable relative to a bridge 26 in a direction perpendicular to the Z direction, and defined in the diagram as the X direction. The bridge 26 is in turn supported on a table or bed 28 of the machine 20 for movement in a direction defined as the Y direction, which is orthogonal to both X and Z directions. Movements of the head 22, carriage 24 and bridge 26 are effected by motors Mx,My,Mz which are controlled by a machine control computer 30. Displacement of the head 22 in the X,Y,Z directions is measured relative to a datum by three machine transducers (not shown) whose outputs Tx,Ty,Tz are sent to a machine control 30.

An analogue touch probe (known per se from e.g. WO 90/04149) 40 having a stylus 42 for contacting a workpiece is attached to the head 22 of the machine 20. The stylus 42 is supported by the probe 40 for movement relative to the head 22 in the directions X,Y,Z. Displacement of the stylus 42 in each of these directions is determined by a probe transducer (not shown) provided in the probe 40 whose outputs tx,ty,tz are sent to the control 30. If the stylus 42 is brought into contact with a workpiece surface, then provided the length of the stylus 42 is known, the probe 40 will provide an output corresponding to the distance between the head 22 and the surface. By combining the outputs tx,ty,tz of the probe transducers with the outputs of the machine transducers Tx,Ty,Tz, the position of the point of contact between the stylus 42 and the surface relative to the datum can be determined by the control 30.

The range of distance between the head 22 and the surface over which the probe 40 may measure the surface is known as the measuring range of the probe 40. When the probe 40 is within measuring range of a surface, the probe 40 is close enough to the surface to cause the stylus 42 to contact the surface, and yet not so close at to cause collision damage. To scan an unknown surface the probe must be driven over the surface and maintained within a range of distances from the surface, corresponding to the measuring range of the probe 40. Movement of the probe is controlled by the control 30, which determines from values of Tx,Ty,Tz and tx,ty,tz, the x and y coordinates of points on a surface and predicts from this information a subsequent position to which the probe should be driven.

Figure 3:
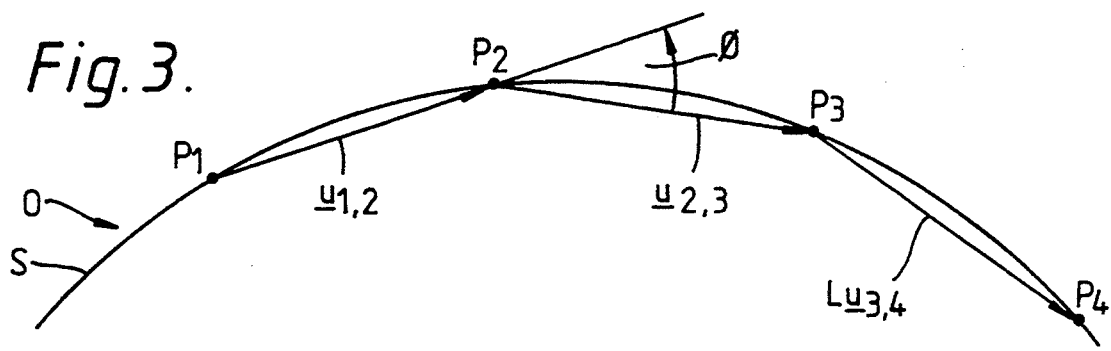
FIGS. 3 to 5 are diagrams illustrating calculations involved in the method of the present invention.

Referring now to FIG. 3, an object O has a surface S whose profile varies in an X,Y plane. Three points $P_1$, $P_2$, and $P_3$ have X and Y coordinates $(X_1,Y_1)$, $(X_2,Y_2)$, $(X_3,Y_3)$ which are known by the machine control 30. From the known positions of these points, it is desired to predict the position of a subsequent point $P_4$ lying on the surface S in order that the control can operate motors Mx,My,Mz to drive the probe 40 to within measuring range of $P_4$. To this end, the machine control 30 initially determines whether the points $P_1,P_2,P_3$ lie on a straight or substantially straight line. If this proves to be the case, point $P_4$ is assumed to be on this line at a distance from point $P_3$ corresponding to a parameter known as the maximum permitted point separation $L_{max}$, which is defined later. If no such linear relationship is found to exist the position of the point $P_4$ is then predicted upon the basis of an assumption that the points $P_1$ to $P_4$ lie upon a circular arc. The position of the point $P_4$ is defined in terms of a position vector from the point $P_3$:

$$L\hat{U}_{3,4} \quad (1)$$

where:

L is the distance of $P_4$ from $P_3$; and
$\hat{U}_{3,4}$ is a unit vector extending from point $P_3$ toward point $P_4$.

The prediction of point $P_4$ must be performed in real time. It is therefore a requirement that the mathematical operations required to predict $P_4$ are relatively simple. For clarity of explanation, these operations will now be explained in two distinct steps; the practical implementation does not however require this.

1. DETERMINATION OF $U_{3,4}$

Consider position vectors of point $P_2$ ($U_{1,2}$) from point $P_1$, and point $P_3$ ($U_{2,3}$) from point $P_2$:

$$U_{1,2} = i\,(x_2-x_1) + j\,(y_2-y_1) \quad (2)$$

$$U_{2,3} = i\,(x_3-x_2) + j\,(y_3-y_2) \quad (3)$$

Where i and j are unit vectors in the x and y directions respectively.

Taking unit vectors of the vectors $U_{1,2}$ and $U_{2,3}$:

$$\hat{U}_{2,3} = U_{1,2}|U_{1,2}| \quad (4)$$

$$\hat{U}_{2,3} = U_{2,3}|U_{2,3}| \quad (5)$$

enables the angle $\phi$ between the unit vectors $U_{1,2}$ and $U_{2,3}$ to be determined from the magnitude of their cross product:

$$\sin \phi = |\hat{U}_{1,2} \times \hat{U}_{2,3}| \quad (6)$$

the unit vector $U_{3,4}$ is then found by rotating $U_{2,3}$ about point $P_3$ by the angle $\phi$ specifically:

$$\hat{U}_{3,4} = (Pxi + Pyj) / |U_{3,4}| \quad (7)$$

where:

$$Px = (x_3-x_2)\cos\phi + (y_3-y_2)\sin\phi \quad (8)$$

$$Py = (x_3-x_2)\sin\phi + (y_3-y_2)\cos\phi \quad (9)$$

2. DETERMINATION OF L

Figure 4:
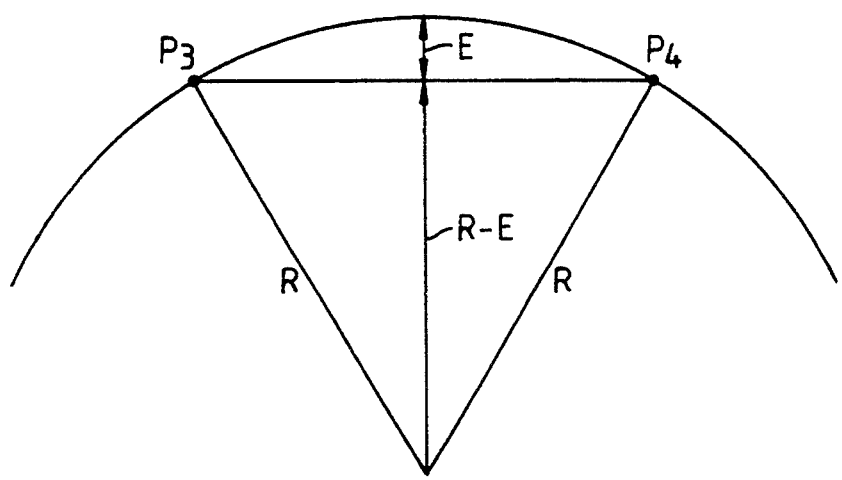

Referring to FIG. 4, it can be seen that:

$$R^2 = (R-E)^2 + L^2/4 \quad (10)$$

where E is a parameter known as the chordal error, which is preselected by the user in advance.

Expanding:

$$R^2 = R^2 + 2ER + E^2 + L^2/4$$

for small values of E, $E^2 << 2ER$ $$\therefore L = [8ER]^{\frac{1}{2}} \quad (11)$$

Figure 5:
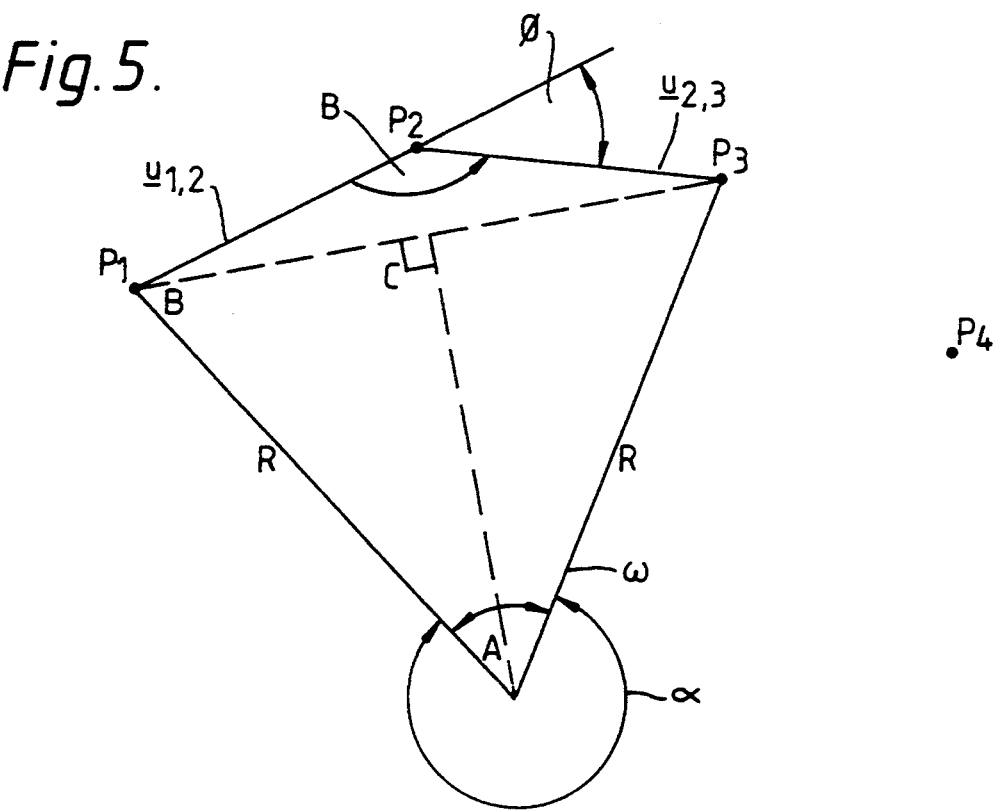

Referring to FIG. 5, R is calculated in the following way:

considering right angle triangle ABC $$BC/R = \sin w/2 \quad (12)$$

now:

$$BC = [(x_3-x_1)^2 + (y_3-y_1)^2]^{\frac{1}{2}}/2$$

$360-w=x;\ x=2\beta$ (angle at centre = 2 angle at circumference on same arc)

and $$180 - \beta = \phi$$

$$\therefore w = 360 - 2(180-\phi) = 2\phi$$

so equation (12) becomes $$R = [(x_3-x_1)^2 + (y_3-y_1^2]^{\frac{1}{2}}/2 \sin \phi \quad (13)$$

from equation (6)

$$\sin \phi = |\hat{U}_{1,2} \times \hat{U}_{2,3}|$$

so $$R = [(x_3x_1)^2 + (y_2-y_1)^2]^{\frac{1}{2}}/2\ |\hat{U}_{1,2} \times \hat{U}_{2,3}| \quad (14)$$

The mathematical analysis by which the final expression for equation (1) has been obtained is set out above to provide a further understanding of the method of the present invention. However, it is not necessary for the machine control to follow this procedure each time the position of a point is to be estimated. The values of L and $\hat{U}_{3,4}$ have each been determined solely in terms of the x and y coordinates of the points $P_1$ to $P_3$ and the preselected value E. It would therefore be possible to reduce the position vector $L\hat{U}_{3,4}$ to a single expression in such terms.

In practice L and $\hat{U}_{3,4}$ are evaluated separately. This enables the calculated value of L to be compared with a predetermined maximum permitted value of L ($L_{max}$) which is dependent upon the smallest feature size of the surface to be scanned. The smallest feature size should be 3 to 5 times greater than the value of $L_{max}$. If the calculated value of L exceeds the value $L_{max}$, L will be restricted to $L_{max}$.

It should be noted that the expressions which are evaluated in order to determine the position of point $P_4$ are single-valued and have solutions which are real, enabling fast calculation to be performed. This is, as is mentioned above, important in enabling point prediction in real time.

In a modification of the present invention $\phi$ is estimated on the basis of the angle between the immediate past set of points.

In a further modification, the speed with which the head of the machine is driven is determined on the basis of the angle $\phi$. For example, the driving speed is the product of a maximum permitted speed and the cosine of angle $\phi$.

In a simple adaptation of the present invention, scanning is performed with a touch measuring probe using the method of "2 point scanning" employed in the prior art for optical probes. This simplified method does not take surface curvature into account when predicting a subsequent point, but is nonetheless free from the problems associated with the prior art method of controlling a machine for scanning with a touch probe (discussed in the introduction to the present application).

We claim:

1. A method of controlling a coordinate positioning machine, the machine having a head, and a contact measuring probe connected to the head for sensing a distance between a surface and the head, the method controlling the machine to drive the head along a path adjacent an unknown workpiece surface, and to maintain the probe within measuring range of the surface, the method comprising the steps of:

measuring, using the contact measuring probe, the position of at least three points on the surface of the workpiece and lying on the path traced by the head;

predicting, in real time from at least the three previously measured points, the position of a subsequent point; and driving the head to a position at which the measuring probe lies within measuring range of the subsequent point.

10. A method of controlling a coordinate positioning machine having a head, and a contact measuring probe connected to the head for sensing a distance between a surface and the head, the method controlling the machine to drive the head along an unknown path adjacent a workpiece surface, and to maintain the probe within measuring range of the surface, the method comprising the steps of:

measuring, using the contact measuring probe, the position of at least two points on the surface of the workpiece and lying on the path traced by the head;

predicting, in real time from the two previously measured points the position of a third point; and driving the head to a position at which the measuring probe lies within measuring range of the third point.

2. A method according to claim 1 wherein the step of determining the position of a subsequent point comprises the steps of:

a) determining whether the three measured points lie on a straight, or substantially straight line;

b) if the three measured points do not lie on a straight line, determining the direction of a unit vector ($\hat{U}_{3,4}$) pointing towards the subsequent point, and determining a point separation distance to the subsequent point.

5. A method according to claim 4, wherein a separation between said third and said subsequent points is calculated on the basis of the radius of curvature of said circle, and a preselected parameter, being the chordal error between said circumference and a chord defined by a line joining said third and said subsequent point.

3. A method according to claim 2 wherein said unit vector $\hat{U}_{3,4}$ is determined on the basis of the angle between lines joining said three measured points, and the position vector of the third of said points as defined from the second of said points.

7. A method according to claim 1 further comprising the step of determining a speed for driving the head to said position adjacent said subsequent point, on the basis of the angle between lines joining said three measured points.

8. A method according to claim 1, wherein the step of predicting the position of the subsequent point includes the steps of:

determining whether the three measured points lie on a straight line;

if the three measured points lie on a straight line, predicting the position of the subsequent point as lying on said straight line, and spaced from the third of said three measured points by a predetermined 9. A method according to claim 7, wherein said predetermined distance is at least three times smaller than the smallest feature size of said unknown workpiece.

4. A method according to claim 1, wherein the step of predicting the position of the subsequent point includes the steps of:

determining whether the three measured points lie on a straight line;

if the three measured points do not lie on a straight line, defining a circle whose circumference extends through said three points, and predicting the position of the subsequent point as lying on said circumference.

6. A method according to claim 4, wherein said subsequent point is defined in terms of a unit vector $\hat{U}_{3,4}$, calculated on the basis of an angle between intersecting lines joining the first and second, and second and third of said three measured points, together with a position vector for the third of said measured points as defined from the second of said measured points.

* * * * *